United States Patent [19]

Zayas et al.

[11] Patent Number: 4,849,244

[45] Date of Patent: Jul. 18, 1989

[54] COMMINUTED MEAT PRODUCTS SUPPLEMENTED WITH CORN GERM PROTEIN

[75] Inventors: Joseph F. Zayas; Chyi-Shen Lin, both of Manhattan, Kans.

[73] Assignee: Kansas State University Research Foundation, Manhattan, Kans.

[21] Appl. No.: 273,151

[22] Filed: Nov. 18, 1988

Related U.S. Application Data

[63] Continuation of Ser. No. 870,072, Jun. 3, 1986, abandoned.

[51] Int. Cl.$^4$ ............................................. A23L 1/31
[52] U.S. Cl. .................................... 426/602; 426/622; 426/646; 426/654
[58] Field of Search ................ 426/602, 622, 646, 654

[56] References Cited

U.S. PATENT DOCUMENTS

| | | | |
|---|---|---|---|
| 3,650,767 | 3/1972 | Stump et al. | 426/646 |
| 3,689,285 | 9/1972 | Griffin et al. | 426/646 |
| 3,900,576 | 8/1975 | Schulz | 426/654 |
| 4,461,777 | 7/1984 | Murase et al. | 426/602 |
| 4,495,207 | 1/1985 | Christanson et al. | 426/622 |

OTHER PUBLICATIONS

Journal of Food Science, vol. 38 (1973), "Composition of Three Food Products Containing Defatted Corn Germ Flour"; C. W. Blessin, W. J. Garcia, et al.; pp. 602–606, inclusive.

Primary Examiner—R. B. Penland
Attorney, Agent, or Firm—Hovey, Williams, Timmons & Collins

[57] ABSTRACT

Corn protein fortified ground or comminuted meat products such as sausages or frankfurters are provided which exhibit enhanced cooking and organoleptic properties including water holding capacity, yield and lessened cooking loss, without adverse product flavor associated with soy or other plant proteins. In practice, aqueous preemulsions including particulate fat (e.g., lard) stabilized and enrobed by corn-derived protein are mixed with meat, formed and cooked to yield finished meat products. The most preferred source of corn protein is defatted corn germ protein flour, although traditional corn meal or defatted germ concentrates or isolates may be employed. Advantageously, the corn-derived protein flour is initially tempered and swelled in warm water, whereupon liquid fat is blended with the tempered material and emulsified. The preemulsions may then be added to a meat formulation such as a batter to give improved final products.

5 Claims, No Drawings

COMMINUTED MEAT PRODUCTS SUPPLEMENTED WITH CORN GERM PROTEIN

This application is a continuation; of application Ser. No. 06/870,072, filed June 3, 1986.

BACKGROUND OF THE INVENTION

1. Field of the Invention

The present invention is concerned with improved, corn protein-fortified meat products of the ground or comminuted variety such as sausages, knowkwursts, or frankfurters. More particularly, it is concerned with products of this character which are suplemented with emulsions comprising corn-derived protein, particulate fat, and water, to form a stable fat and water emulsion with the protein at least partially enrobing and stabilizing the fat to prevent coalescence thereof.

2. Description of the Prior Art

It has been suggested in the past to supplement and fortify traditional meat products with plant-derived protein. Such additive materials not only add bulk to the product, but actually enhance the nutritional product properties of the meat because of the use of relatively high protein, low fat plant protein additives. For example, soy protein in the form of processed or plain defatted soy flour has been used for a number of years in meat and other products. However, in recent times the use of soy has been declining, principally because of the characteristic and unpleasant off-flavor of final products supplemented with soy.

In addition to soy protein, it has also been suggested in the past to make use of various milk-derived protein such as sodium caseinate or non-fat dry milk powder. While these materials are excellent sources of protein, they are objectionable principally from the standpoint of cost. Also, other materials such as sesame and wheat flour have been proposed in the past as supplements to meats and other foods. However, these products have not achieved widespread commercial utilization.

Defatted corn germ flour is a byproduct of the corn oil industry, and has been utilized as an ingredient in animal feeds. This product has not been employed on a widespread basis in human foods because of product deterioration occurring by virtue of residual lipids in the flour which oxidize and may contribute to off flavors. U.S. Pat. No. 4,495,207 describes a process designed to provide a high protein food grade defatted corn germ protein flour, making use of an extraction technique employing carbon dioxide under supercritical conditions. Products resulting from this process contain approximately 19% protein, 32% starch and only trace amounts of lipids (all on a moisture-free basis). The process described in U.S. Pat. No. 4,495,207 gives promise of commercial availability of defatted corn germ protein flour at a reasonable cost, while avoiding the rancidity problems heretofore associated with this product.

Prior suggestions regarding the use of defatted corn germ flour have been limited to use thereof on a simple incorporation basis, i.e., addition of various levels of the flour to otherwise conventional foods such as cookies, muffins and beef patties. While such a procedure does provide advantages, it would also be desirable to actually enhance organoleptic and other product properties through the use of corn-derived protein. In the case of meat products for example, properties such as water holding capacity (which relates to the "juiciness" of the product), yield and lessened cooking losses due to fat separation are very important to processors and consumers. Hence, while protein fortification is in and of itself a desirable goal, if this could be achieved along with other product improvements of the type described, it would represent a truly significant breakthrough in the art.

SUMMARY OF THE INVENTION

The goal of the present invention is to provide improved meat products exhibiting enhanced nutritional properties by virtue of the inclusion of corn-derived protein. At the same time, the finished meat products are at least the equal of, and in many cases improved, in terms of organoleptic and other desirable properties. Broadly speaking, the meat products of the present invention are those formulated using ground or comminuted meat particles. Typical examples of this class of product include frankfurters, knockwursts, sausages and bologna-type processed meats. Moreover, textured meat products such as ham and turkey rolls are within the ambit of the invention. In these textured products, corn germ protein will play the role of a binding component.

In practice, a corn protein-supplemented ground or comminuted meat product is made by initially providing a particulate fat in water emulsion having therein respective quantities of corn-derived protein, particulate fat, and water, with the fat particles being at least partially enrobed with the corn-derived protein for preventing coalescence thereof. This previously prepared emulsion is added to a quantity of meat particles such as a sausage or frankfurter batter, and the previously prepared corn protein-fat emulsion and the meat particles are blended to obtain a substantially homogeneous mixture. In the case of sausages or frankfurters for example, the finished visco-elastic batter would then be formed and cooked in the conventional way.

The most preferred corn protein material for use in the invention is defatted corn germ protein flour of the type described in U.S. Pat. No. 4,495,207. However, in other instances use can be made of conventional corn meal, or other defatted high protein products such as defatted corn germ protein concentrate or isolate.

The fat component of the corn protein-fat emulsions can be virtually any animal or vegetablederived fat, but in many instances lard is preferred. Vegetable oils such as soy, sunflower or safflower oil can also be employed.

DESCRIPTION OF THE PREFERRED EMBODIMENTS

In the practice of the present invention a corn protein emulsion is prepared for addition to ground or comminuted meats. This emulsion advantageously contains from about 2% to 4% by weight of corn-derived protein, more preferably from about 2% to 3% by weight, and most preferably from about 2.2% to 2.75% of the protein. On the other hand, the emulsions would characteristically contain from about 10% to 60% by weight of particulate fat, more preferably from about 20% to 40% by weight thereof, and most preferably from about 28% to 32% by weight of the fat. This fat in the final emulsion is in particulate form, and should advantageously have an average diameter of from about 1 to 20 micrometers, and more preferably from about 3 to 10 micrometers.

The water component of the emulsions should be present at a level of from about 30% to 60% by weight, and more preferably from about 45% to 55% by weight.

The described emulsions are in the form of stable direct or fat in water emulsions, with the corn-derived protein at least partially enrobing and stabilizing the fat particles to prevent coalescence thereof. In order to achieve this state, it is preferred to initially temper and swell the corn-derived protein fraction in water prior to mixing and emulsification with fat. That is to say, in the preferred form of the invention, the protein is placed in water having a temperature of from about 80° C. to 90° C. for a period of from about 10 to 60 minutes, so that the initial protein-water mixture has a viscosity ranging from about $1 \times 10^3$ to $2.0 \times 10^3$ centipoise. Thereafter, a quantity of liquid fat is blended with the protein-water mixture, typically on an incremental basis and the blend is subjected to emulsification in a homogenizer or emulsification mill during and after fat addition to yield the final emulsion.

If the most preferred corn protein product is utilized, namely defatted corn germ protein flour, such flour should be present in the corn protein-fat emulsion at a level of from about 8% to 15% by weight, more preferably from about 8% to 12% by weight, and most preferably at a level of from about 9% to 11% by weight.

After formulation of the corn protein-fat preemulsion, the latter may be chilled and thereupon added to previously prepared meat particles, followed by blending the emulsion and meat particles to obtain a substantially homogeneous mixture. As indicated above, where sausages, frankfurters or like products are desired, the meat products are conventionally formulated as batters, and such batters are mixed with the preemulsions. At this point, the visco-elastic mixture can be formed into links or the like, and subjected to conventional cooking and final processing.

In terms of the final corn protein-supplemented meat products of the invention, such should comprise from about 10% to 14% by weight of total pure protein, and more preferably from about 11% to 13% by weight thereof. Total fat content should be in the range of 22% to 30% by weight, and more preferably from about 26% to 30% by weight thereof. The final products should contain from about 5% to 15% by weight of the preemulsion-derived fat in particular form, and more preferably from about 5% to 10% by weight of this fat. From about 0.8% to 1.5% by weight of the total pure protein is in the form of corn-derived protein, and more preferably from about 1.0% to 1.1% by weight thereof. As indicated, the preemulsion fat particles in the final product are at least partially enrobed with the corn-derived protein, in order to stabilize the fat particles and prevent coalescence thereof.

The meat particles used in the final products can obviously be selected from a wide variety of conventonal meats, but beef and pork are preferred. The fat particles are advantageously a source different than the meat, although this is not essential. Here again, if defatted corn germ protein flour is used to provide the corn-derived protein fraction of the final meat products, flour should be present in the meat products at a level of from about 2% to 4% by weight, and more preferably from about 3.0% to 3.5% by weight.

Meat products in accordance with the present invention exhibit a number of desirable properties. First, the nutritional quality of the meat is significantly enhanced by virtue of the high quality corn protein present. Moreover, increased yields of final meat products are obtained by virtue of increased water holding capacity and fat binding capacity characteristic of the products. Such properties result in decreased weight loss during cooking. Test results indicate that the water holding capacity of products in accordance with the invention is 10 to 15% higher than controls.

In the case of sausage and frankfurter emulsions, the latter have increased stability and emulsifying capacities and result in a more uniform distribution of fat globules in the structure of the finished product. The organoleptic properties of the meat products are also enhanced, particularly juiciness, texture and taste. Indeed, the preferred products in accordance with the invention are characterized by the complete elimination of unpleasant off flavors such as those characteristic of soy-fortified foods.

EXAMPLE

In this series of tests preemulsions of fat (lard), corn germ protein flour and water were prepared and used in frankfurter batter to prepare finished meat products.

The preemulsion in each case was initially formulated by incubating corn germ protein flour (obtained from USDA Norther Regional Research Center, Peoria, Ill.) in water in an 85° C. water bath for 1 hour, followed by preblending at low speed (8,000 rpm) using an Oster blender (Model 548-41A) for 1 minute. Melted pork fat was then added dropwise over a period of 1.5 minutes while the mixture was emulsified at high speed (20,000 rpm) using the Oster blender; the final mixture was then allowed to emulsify for an additional 1.5 minutes at 20,000 rpm. The preemulsions were then chilled to 15°–20° C. to assume a semi-liquid state. The preemulsion compositions contained 37.5 g. fat, 3 or 6 g. corn germ protein flour g. (1% or 2% flour in the final sausage batter) and 45 g. of water.

Fresh beef (beef trim and plate, 20% fat) obtained from the meat laboratory of Kansas State University was ground through a 9.38 mm. plate, mixed thoroughly, and reground three times through a 4.69 mm. plate. The comminuted meat was divided randomly into 300 g. samples, sealed in vacuum packages and frozen at −12° C.

The frankfurter products were made in accordance with the procedure of Whiting and Richards, *J. Food Sci.* 43:312; however, in those samples where corn protein flour was to be added, an additional 1% of water was added for every added 1% of flour, so as to achieve the same moisture level for all samples. Respective 263 g. frozen meat samples were thawed for 12 hrs. at 4° C., chopped with 2% added salt and ⅓ of the total 39% added water (as ice chips) in a prechilled food processor (General Elelctric, Model PF6) for 1 minute. The temperature of the meat samples was raised to an average of 6°–8° C. by this procedure. Another ⅓ of the total water of the formula and 0.3% prague powder containing 6.25% sodium nitride (Griffith Laboratories, Alsip, Ill.) were added to each meat sample and chopped for 30 seconds to 11°–13° C. The samples were then chilled in the freezer for 10 minutes to temper and lower the temperature of the batter.

Control and test samples were then prepared, each containing a total of 25% added fat. Specifically, the controls contained no corn protein flour and were prepared by chopping the tempered batter for 1 minute while adding melted lard (35° C.). The test samples were prepared by adding the described preemulsions during the 1 minute chopping time to achieve levels of 1% and 2% of corn gum protein flour in respective test samples.

The test and control batters were held another 10 minutes in the freezer for chilling. A final 30 seconds chopping time was used to add the remaining ⅓ of total water, sugar (1%), commercial frankfurter spice (0.5%; Baltimore spice, Weiner seasoning FF3118) and ascorbic acid (0.1%) to the end temperature of approximately 14°–15° C. The batters were tested as described below for water holding capacity, viscosity, thermal stability, and adhesiveness.

The batter samples were then stuffed into 24 mm. diameter casings which were linked 11 cm. in length and hung on a cooking rack. An internal temperature of 70° C. was obtained in the product after cooking in a rotating oven with relative humidity controlled at 45% at 87° C. for 65 minutes. Stuffed weight and after-cooked weight were recorded to calculate the yields based on the original raw meat and fat.

SPECIFIC COMPARATIVE TESTS

The following tests were run on the batters and final sausage products, and the test results were statistically analyzed.

*Water holding capacity.* The Hamm press technique (Hamm, *Advances in Food Research*, Vol. 10, p. 363, Academic Press, N.Y.) was used with modification to measure the water holding capacity (WHC) of each batter. Batter (0.3 g) was placed on filter paper (Whatman No. 1) which was placed with two plexiglas sheets and pressed for 20 minutes by 1 kg. weight. The areas were measured with a compensating polar planimeter and the WHC was calculated by the following equation:

$$WHC = 1 - \text{total area} - \text{meat film area}/\text{meat film area}$$

Viscosity. All viscosity measurements were made on the batter samples with a Brookfield Synchro-Electric Viscometer (Brookfield Engineering Laboratories, Stoughton, Mass.) using spindle #7 at 10 rpm using the method of Haq et al., *J. Ford Sci.*, 38:271, (1973). The readings were noted after 30 seconds shearing time and recorded in centiposes. Average of 5 measurements on 100 ml. beaker filled with batter were used for statistical analysis.

*Batter thermal stability.* The method of Haq et al., *J. Food Sci.*, 37:480 (1972) and Saffle et al., *Food Technol.* 21(5):101 (1967) with slightly modification were used to test batter thermal stability. A 30 g. batter sample removed at the end of stuffing was placed in a centrifuge tube (27.5 mm × 110 mm.) with screw cap, and heated for 30 minutes in a 70° C. water bath. The tube was centrifuged for 1 minute at 4,000 rpm. All the cookout liquids were drained and collected in a 25 ml. graduated cylinder. Measurements were the average of repeat samplings. Reading of water or fat is expressed as ml.

Color development. The peeled links were taken for the Hunterlab color measurement (Hunterlab D54 Spectrophotometer, Hunter Associates Laboratory, Fairfax, Va.) with ziploc bag. The illuminate A "ILL A" (incandescent lamp), illuminate C "ILL C" (noon-daylight) and L,a,b were used to measure the degree of redness (a value).

Texture analyses. Texture of sausage batter was analyzed by the Instron Universal Testing Machine. The adhesiveness (for batter), hardness and shear force value (for frankfurter) were determined following the descriptions of Bourne, *Food Technol.* 32(7):62 (1978).

The adhesiveness measurement was established to imitate the old technique for flow properties as described by Toledo et al., *J. Food Sci.* 42:725 (1977). The adhesiveness was measured by 25 mm. compression head and descending at a rate of 50 mm/min. The batter hold in an aluminum cup which was secured at position by 1 pound weight. The compression rate measured at 27% and the pulling force pulled the compressing plunger away from the sample was recorded as peak area. The shear force value was measured on ambient temperature of the product with a Warner-Bratzler blade mounted on the Instron, descending speed at 100 mm/min. The hardness was measured by the 25 mm. compression head for 75% of a 2 cm. sample at a speed of 50 mm/min. Replications were done by 4 cuts from at least 2 links.

Sausage cooking test. Fat release and cooling loss were determined by the method of Tauber and Lloyd, *Food Res.* 12:158 (1947) with some modifications. The cooking was performed in the following manner: two links (80–90 g.) of frankfurters were cooked in 250 ml. boiling tap water and for 3 minutes. The volume of separated fat was measured and links were reweighed to calculate the cooking loss.

Content analysis. Ground frankfurter moisture content was determined by the Brabender Semi-automatic Tester (Brabender Corporation, Rochelle Park, N.J.). The fat content was determined by AOAC Babcock meth (AOAC, 1984) with acetic acid and perchloric acid mixture (1:1) on 9 g. paley fat bottle.

Statistical analyses. Analysis of variance and least significant difference tests and regression correlation tests were conducted by the methods of Steel and Torrie, *Principles and Procedures of Statistics*, 2d. Ed., McGraw-Hill. The experimental batch was randomly and independently processed for studying the effect of protein and added water on the comminuted meat product with controlled time and temperature factors.

The effective funtionality of corn germ protein in the production of comminuted meat products was established by these tests. Corn germ protein increased the stability and water holding capacity of the sausage batters. A significant increase in yield of finished products was also found. The enhanced rheological properties (adhesiveness and viscosity) of the sausage batter had important effects on the properties of the finished products. Adhesiveness was positively correlated with batter viscosity, sausage yield and water retention and fat binding during heat treatment. The corn germ protein is believed to absorb excessive water in the system and thereby provide an increase in yield.

The following tables set forth the experimental data collected in this series of tests.

TABLE 1

Textural and water and fat binding properties of sausage batters supplemented with corn protein-fat emulsion[a]

| Corn protein, % | [b] WHC | Viscosity × $10^{-5}$, cps | Adhesiveness cm$^2$ | Thermal Stability[c] Fat | Water |
|---|---|---|---|---|---|
| 0 | .659[d] | 3.10[d] | 5.33[d] | 1.4[d] | 6.1[d] |
| 1 | .687[d] | 2.85[d] | 4.73[d] | 2.2[d] | 7.7[d] |
| 2 | .763[e] | 2.68[d] | 6.07[e] | 1.7[d] | 5.9[e] |

[a]Sausage formulation with 39% added water.
[b]Water holding capacity.
[c]Fat/water loss in ml/30 g of batter.
[d,e]Means in the same column with different superscripts are statistically different (p < 0.05)

TABLE 2

Quality characteristics and yield of frankfurters containing supplemented with corn protein-fat emulsion.

| Corn protein % | Yield % | Color ILL C [a] | Shear force kg | Hardness kg | Cooking Losses fat % | Cooking Losses weight % | Content water T |
|---|---|---|---|---|---|---|---|
| 0 | 126.09[b] | 17.83[b] | 1.05[b] | 4.69[b] | 4.82[b] | 12.12[b] | 59.15[b] |
| 1 | 126.78[b] | 15.43[b] | 1.11[b] | 4.37[b] | 7.22[b] | 12.28[b] | 59.38[b] |
| 2 | 129.11[c] | 16.79[b] | 0.93[c] | 3.61[b] | 6.72[b] | 12.19[b] | 58.73[b] |

[a] Mean values averaged from three replicated experiments. Sausage formulated with 39% added water.
[b,c] Means in the same column with different superscripts are statistically different (p < 0.05).

As can be seen, batters with 2% corn germ protein flour had higher WHC and adhesiveness (p<0.05) than products with 1% (Table 1). Higher thermal stability of water was obtained (p<0.05) for product containing 2% flour than for those with 1% after heat treatment. However, there was no difference in viscosity of the sausage batter containing 1 and 2% corn germ protein flour.

In Table 2, quality characteristics, cooking losses and yield are presented for samples containing 1 and 2% of corn germ protein flour as stabilizer of pre-emulsified fat. Higher yield and lower shear force were obtained for sausage with 2% flour (p<0.05) than for those with 1% (Table 2). No significant differences were found in color, hardness and cooking losses. Excessive added water in the batter formulations and the corn protein-fat emulsions assured that the protein flour was hydrated. The method of emulsion preparation and final temperature of the sausage batters can influence test results. Because the preemulsions were added in semi-liquid state (20°-22°), less water (ice) was used to maintain batter temperature. The higher temperature of the batter after comminution (higher than 17°-18° C.) may show adverse effect on functional properties.

A regression analysis of the test data showed a linear relationship between the amount of corn protein flour added and the measurements of sausage finished product with a positive relation in yield and fat content, and a negative relation in weight and fat losses. The levels of protein flour were maximized at the 4% level; however, higher addition levels are expected to have similar relationships.

The rheological properties of sausage emulsions showed the relationship between water retention in the batters, and water stability after thermal processing. The adhesiveness measurement was established to measure the stability of batter and finished products. Adhesiveness of batter corresponded to viscosity (r=0.646, p<0.001), which also indicated water retention (the same as WHC) (r=0.381, p<0.01) had more influence over cooking stability (adhesiveness; r=−0.576, p<0.01) and rheological properties. However, higher WHC cannot explain the higher loss of fat in thermal treatment. An unstable emulsion may derive from excess disintegration of hydrated corn components during blending and emulsification. Adhesiveness had a positive relation (r=−0.726, p<0.001) with water thermal stability. No significant relationship between fat stability and adhesiveness was found which may relate to the degree of fat emulsification and the temperature of final emulsification. However, the viscosity (r=−0.425, p<0.01), water holding capacity (r=−0.371, p<0.01) and yield (r=−0.454, p<0.001) were related with the fat stability. Viscosity of batters indicated a relationship in thermal stability of fat loss (r=−0.425, p<0.01) which supported the adhesiveness measurement. There was a positive relationship between adhesiveness and yield (r=0.276, p<0.05). Furthermore, thermal stability of fat indicated a direction for yield (r=−0.454, p<0.001). Obtaining of stable emulsions in sausage batter is the critical factor in the preparation of stable product without fat separation and increased yield of product. In this case, batter with proper rheological properties (viscosity and adhesiveness) were obtained.

The resultant sausages with the emulsions of the invention contained small fat globules aggregated in a micellar configuration with dense area at the center. These small globules (0.06 u−0.18 u in diameter), were surrounded by a protein film. Larger fat droplets were evenly distributed in samples containing 2% protein flour. The fat component was stabilized as the larger size fat droplets throughout the emulsion without coalescence.

We claim:

1. In a cooked, comminuted meat product made from a meat-containing emulsion which is formed and cooked, said product having therein respective quantities of meat particles and fat particles, the improvement which consists essentially of a nutritionally useful additive present in said meat-containing emulsion and in said product, said additive being present in an amount effective for stabilizing and inhibiting the coalescence of said fat particles in the meat product, said additive being selected from the group consisting of defatted corn germ protein flour, concentrate, and isolate.

2. The meat product of claim 1, said meat particles being selected from the group consisting of beef and pork.

3. The meat product of claim 1, said fat particles being from a source different then said meat particles.

4. The meat product of claim 1, said fat particles being selected from the group consisting of animal fats and plant-derived oils.

5. The meat product of claim 1, said additive being defatted corn germ protein flour, said flour being present in said meat product at a level of from about 2.0 percent to 4.0 percent by weight.

* * * * *